United States Patent [19]

Mosciatti et al.

[11] 4,187,997
[45] Feb. 12, 1980

[54] VACUUM CONTROL SYSTEM FOR MAGNETIC TAPE HANDLER

[76] Inventors: Roger Mosciatti, 6 Wycomb Pl., Coram, N.Y. 11727; Thomas P. Foley, 12 Janes La., Lloyd Harbor, N.Y. 11743; Frederick G. Moritz, 20 Aberdeen Rd., Hauppauge, N.Y. 11787

[21] Appl. No.: 933,438

[22] Filed: Aug. 14, 1978

[51] Int. Cl.² .................. G11B 15/58; G11B 23/12
[52] U.S. Cl. .................................................. 242/182
[58] Field of Search .................. 242/182–186; 226/95, 97; 366/139; 302/1, 35; 303/11, 12; 352/159

[56] References Cited

U.S. PATENT DOCUMENTS

| | | | |
|---|---|---|---|
| 3,329,364 | 7/1967 | Brettell | 242/182 |
| 3,343,758 | 9/1967 | Hemdal | 242/183 |
| 3,507,432 | 4/1970 | Fecher et al. | 226/89 |

*Primary Examiner*—Leonard D. Christian
*Attorney, Agent, or Firm*—Alfred W. Barber

[57] ABSTRACT

The vacuum for controlling tape loop tension in a magnetic tape handler is supplied by a low speed multiple stage vacuum blower and controlled by a low power solenoid and a flapper valve operated between two predetermined positions. In order to provide fast operation of the flapper valve in response to the low power solenoid a fast acting fluid amplifier is utilized between the solenoid and the flapper valve. The elimination of belts, gears and high speed blowers results in an unusually quiet system.

3 Claims, 3 Drawing Figures

VACUUM CONTROL SYSTEM FOR MAGNETIC TAPE HANDLER

PRIOR ART

Vacuum tensioning of tape loops in magnetic tape handlers has been widely practiced for several years. In such machines, when starting or stopping, the head of vacuum in the vacuum chambers must be changed rapidly. The vacuum is created by means of motor driven fans. In the past, in order to provide the necessary vacuum and to change its head rapidly either very high speed motors or belt driven or geared up fans were employed. Such systems not only required substantial surges of power but were also noisy. With several or many tape handlers in one area, the undesirable effects are multiplied. A further problem with high speed belt driven blowers is their limited reliability. The noise problem can be overcome by using a lower speed blower, heavier motor and more stages. However, such a blower is too slow on starting and stopping to satisfy the rapid programming requirements of magnetic tape handlers.

THE PRESENT INVENTION

The present invention employs a low speed quiet motor with, say, seven stages and running constantly to provide a vacuum reservoir. A low invertia, fast response flapper valve is provided between the vacuum reservoir and the vacuum ports in the tape handler. The open position of the flapper valve is controlled so that a predetermined degree of vacuum is provided at the vacuum ports. In the closed position a very low degree of vacuum is transmitted which is acceptable. If necessary a so-called "zero" value with a gasket seal may be provided to reduce the vacuum to essentially zero. The flapper valve is actuated by means of a low power solenoid which closes a port to the ambient allowing vacuum to operate the valve through a fluid amplifier. The fluid amplifier includes a piston coupled to a sector attached to a shaft on which the flapper valve is located. A valve in the vacuum line to the piston provides means for controlling the vacuum at the piston and so the speed of response of the system. To close the flapper valve, the solenoid is deenergized opening the port dumping the vacuum at the piston and in turn allowing the flapper valve to close sealing off the vacuum to the machine ports. Various refinements will be described in the detailed description of the invention given in connection with the various figures of the Drawing.

Figure 1:
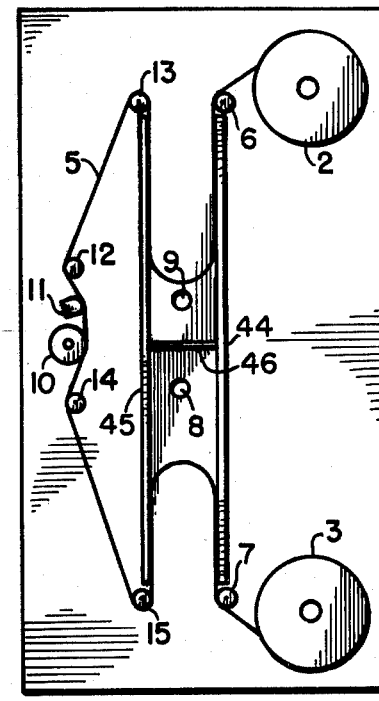
FIG. 1 is a simplified front view of a tape handler embodying the present invention.

FIG. 1 shows a tape handler frame 1 on which are mounted the two tape reels 2 and 3 between which passes, in either direction, a magnetic tape 5. The path of the tape starting at the top reel 2 passes over an idler roller 6, into a vacuum tank formed by side pieces 44 and 45 and partition 46 and drawn by vacuum supplied at port 9; over idler rollers 13 and 12, across record/-play-back head, drive capstan 10; then over over idler rollers 14 and 15 and into the lower portion of the vacuum tank drawn by vacuum supplied at port 8; thence over idler 7 to the lower reel 3. The essence of this invention is the method of and means for supplying and controlling the vacuum at ports 8 and 9.

Figure 2:
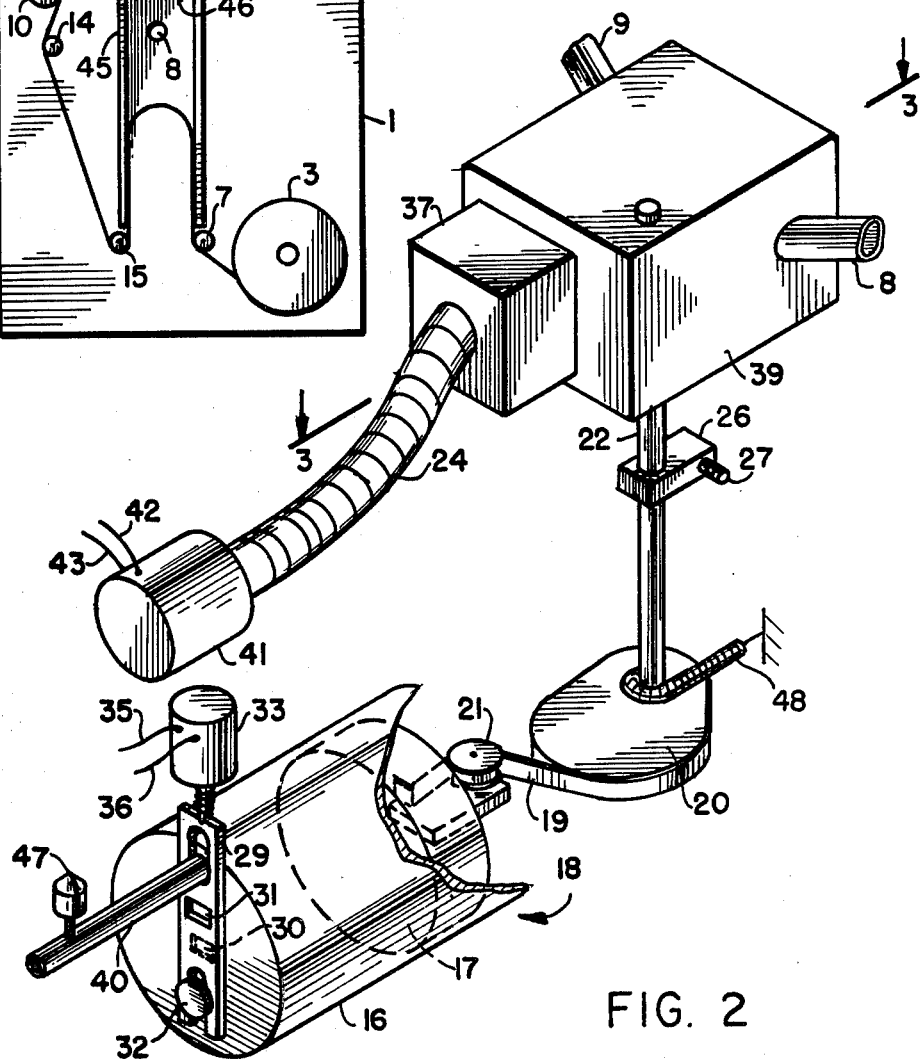
FIG. 2 is a view in perspective of the essential elements of the invention.

FIG. 2 shows, in perspective, the essential components of the vacuum system of the present invention. The control of vacuum takes place in manifold 39 which is coupled over tubes 8 and 9 (corresponding to ports 8 and 9 of FIG. 1) to the vacuum chambers of FIG. 1 as output means and over hose 24 to a seven stage vacuum blower 41 as imput means. Vacuum fan 41 receives power over leads 42 and 43.

Figure 3:
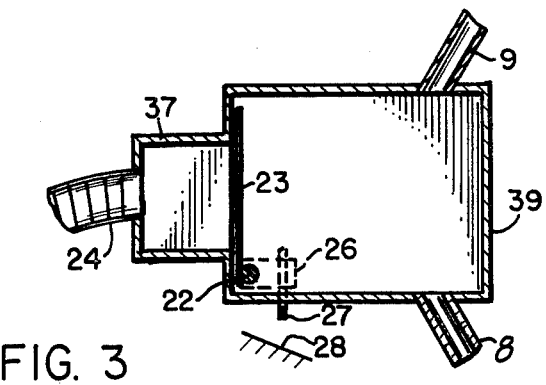
FIG. 3 is a cross-sectional view of one of the components of the invention.

FIG. 3 shows in cross-section how the vacuum between input and output means is controlled in manifold 39. Input hose 24 is sealed to the end of chamber 37 which communicates with manifold 39 depending on the position of flapper valve 23. Flapper valve is mounted on a control shaft 22. When this shaft is rotated counter-clockwise, flapper valve 23 seals chamber 37 from manifold 39 preventing vacuum being drawn into manifold 39 and in turn over output tubes 8 and 9. When shaft 22 is rotated clock-wise, flapper valve 23 opens communication between between chamber 37 and manifold 39 thereby drawing a vacuum in manifold 39 and out over tubes 8 and 9. An adjustable stop consisting of block 26 attached to shaft 22 and adjustment screw 27 bearing in the open position of flapper valve 23 against stop 28. This adjustment serves to limit the maximum vacuum produced in manifold 39 and over output lines 8 and 9 to the vacuum chambers of the tape handler (FIG. 1).

Returning to FIG. 3 details of how shaft 22 and hence flapper valve 23 are controlled. Shaft 22 is rotated by means of piston 17 operating a cylinder 16 and pulling flexible tape 19 around idler roller 21 and moving cam 20 attached to shaft 22. Piston 17 is shown in its initial position and in this position its attached tape 19 pulls cam 20 at its maximum radius and hence with maximum force. As piston 17 is pulled further and further into cylinder 16, tape 14 pulls cam 20 at a smaller and smaller radius and hence with constantly decreasing force. In order to pull piston 17 into cylinder 16, a vacuum is created therein under remote control. A vacuum line 40 is brought into the inner end of cylinder 16 thereby creating a vacuum in cylinder 16 and pulling piston into itself, rotating cam 20, etc. This vacuum and hence the pull on piston 17 is relaxed or countered by admitting air into the cylinder through port 30. Port 30 is opened admitting the air by superimposing a second port 31. Port 31 is carried by a sliding member 29 maintained on track by knob 32. Slide 29 is pulled up by means of a solenoid 33 energized over leads 35 and 36. When Solenoid 33 is deenergized, slide 29 drops due to gravity and port 31 falls over port 30 allowing air to enter cylinder 16 and allowing cylinder 17 to move outward. This rotates cam 20 and in turn shaft 22 and flapper valve 23 closes shutting off the vacuum to the tape handler lines 8 and 9. In order to open flapper valve 23 and establish vacuum in tape handler lines 8 and 9 and hence in the vacuum chambers of the tape handler, solenoid 33 is energized pulling up slide 29, closing port 30, pulling a vacuum in cylinder 16 over vacuum line 40, and pulling piston 17 into cylinder 16, thereby rotating cam 20 and shaft 22 to open flapper valve 23. When solenoid 33 is deenergized in order to release the vacuum, slide 29 drops closing vacuum port 30 and allowing return spring 48 to rotate cam 20 pulling piston 17 outward and rotating shaft 22 to close flapper value 23.

The speed of response of the system for operating flapper valve 23 and hence the creation of vacuum in the vacuum chambers as described above is controlled by an additional valve 47 in vacuum line 40. This additional valve permits controlling the speed with which flapper valve 23 is opened on command so that a smoothly operating system is provided.

While the preferred form of the invention has been shown and described above, modifications are possible within the spirit and scope of the invention as set forth in the appended claims.

We claim:

1. In a magnetic tape handler, the combination of;
a pair of servo controlled tape reels for winding magnetic tape back and forth over a predetermined path between the two reels;
a capstan for drawing said tape across a play/record magnetic head;
a pair of vacuum chambers, one located along the tape path between said capstan and one of said reels and the other located along the tape path between said capstan and the other of said reels;
a vacuum blower for providing a vacuum in said vacuum chambers;
a closed vacuum path between said blower and said chambers;
valve means within said path for controlling the vacuum in said chambers;
wherein said valve means includes a flapper valve;
a shaft attached to said flapper valve for rotating said flapper valve between a predetermined open position and a predetermined closed position;
means for adjusting said predetermined open position;
a piston in a third vacuum chamber coupled to a cam of decreasing radius which in turn is attached to said shaft for rotating said shaft in the presence of vacuum in said third vacuum chamber;
and a solenoid valve for controlling the vacuum in said third vacuum chamber.

2. In a magnetic tape handler, the combination of;
a pair of servo controlled tape reels for winding magnetic tape back and forth over a predetermined path between the two reels;
a capstan for drawing said tape across and play/-record magnetic head;
a pair of vacuum chambers, one located along the tape path between said capstan and one of said reels and the other located along the tape path between said capstan and the other of said reels;
a vacuum blower for providing a vacuum in said vacuum chambers;
a closed vacuum path between said blower and said chambers; valve means within said path for controlling the vacuum in said chambers;
wherein said valve means includes a flapper valve;
a shaft attached to said flapper valve for rotating said flapper valve between a predetermined open position and a predetermined closed position;
means for adjusting said predetermined open position;
a piston in a third vacuum chamber coupled to a cam of decreasing radius which in turn is attached to said shaft for rotating said shaft in the presence of vacuum in said third vacuum chamber;
a solenoid valve for controlling the vacuum in said third vacuum chamber;
and valve means for controlling the maximum degree of vacuum in said third chamber.

3. In a magnetic tape handler, the combination of;
a pair of servo controlled tape reels for winding magnetic tape back and forth over a predetermined path between the two reels;
a capstan for drawing said tape across a play/record magnetic head;
a pair of vacuum chambers, one located along the tape path between said capstan and one of said reels and the other located along the tape path between said capstan and the other of said reels;
a vacuum blower for providing a vacuum in said vacuum chambers;
a closed vacuum path between said blower and said chambers;
and valve means within said path for controlling the vacuum in said chambers;
wherein said valve means includes a flapper valve;
a shaft attached to said flapper valve for rotating said flapper valve between a predetermined open position and a predetermined closed position;
means for adjusting said predetermined open position;
a piston in a third vacuum chamber coupled to a cam of decreasing radius which in turn is attached to said shaft for rotating said shaft in the presence of vacuum in said third vacuum chamber;
a solenoid valve for controlling the vacuum in said third vacuum chamber;
and spring means for rotating said cam to close said flapper valve upon the release of vacuum in said third vacuum chamber.

* * * * *